(12) United States Patent
Friedlmeier et al.

(10) Patent No.: US 8,267,268 B2
(45) Date of Patent: Sep. 18, 2012

(54) HIGH-PRESSURE GAS TANK AND METHOD OF FILLING A HIGH-PRESSURE GAS TANK

(75) Inventors: Gerardo Friedlmeier, Leinfelden-Echterdingen (DE); Steffen Maus, Stuttgart (DE)

(73) Assignee: Daimler AG, Stuttgart (DE)

( * ) Notice: Subject to any disclaimer, the term of this patent is extended or adjusted under 35 U.S.C. 154(b) by 235 days.

(21) Appl. No.: 12/653,277

(22) Filed: Dec. 10, 2009

(65) Prior Publication Data

US 2010/0155404 A1    Jun. 24, 2010

Related U.S. Application Data

(63) Continuation-in-part of application No. PCT/EP2008/004045, filed on May 21, 2008.

(30) Foreign Application Priority Data

Jun. 11, 2007    (DE) .......................... 10 2007 027 281

(51) Int. Cl.
*B65D 6/24*    (2006.01)
(52) U.S. Cl. ....................... 220/4.12; 220/4.28
(58) Field of Classification Search .................. 220/581, 220/582, 592, 601; 141/83, 95, 198
See application file for complete search history.

(56) References Cited

U.S. PATENT DOCUMENTS

| | | | | |
|---|---|---|---|---|
| 2,269,092 A | * | 1/1942 | Leddy | 220/581 |
| 4,566,634 A | * | 1/1986 | Wiegand | 239/410 |
| 6,533,002 B1 | * | 3/2003 | Kobayashi et al. | 141/302 |
| 2010/0032934 A1 | * | 2/2010 | Veenstra | 280/834 |

FOREIGN PATENT DOCUMENTS

| | | |
|---|---|---|
| DE | 1 045 434 | 12/1958 |
| DE | 1 271 579 | 6/1968 |
| DE | 43 42 210 | 6/1995 |
| DE | 199 59 279 | 6/2001 |
| DE | 100 31 155 | 1/2002 |
| DE | 20 2004 015 142 | 1/2005 |
| DE | 10 2004 044 259 | 1/2006 |
| DE | 10 2006 025 185 | 2/2007 |
| JP | 2003 267069 | 9/2003 |
| JP | 2003267069 A * | 9/2003 |
| JP | 2005 180496 | 7/2005 |
| JP | 2005 221049 | 8/2005 |
| JP | 2010-511512 | 4/2010 |

OTHER PUBLICATIONS

Translated Title and Abstract of DE 10031155 published Jan. 17, 2002.*
Abstract of JP-2003267069-A.*

* cited by examiner

*Primary Examiner* — Stephen Castellano
(74) *Attorney, Agent, or Firm* — Klaus J. Bach

(57) ABSTRACT

In a high-pressure gas tank for motor vehicles and a method for filling a high-pressure gas tank which has an interior space for holding gas and a filling region with an inflow opening which leads to the interior space, the filling region is formed so as to direct a gas jet which enters through the inflow opening at an angle φ upwardly with respect to a central horizontal longitudinal axis of the interior space toward a top wall of the tank where the gas jet is deflected toward the end of the tank opposite the filling region.

8 Claims, 4 Drawing Sheets

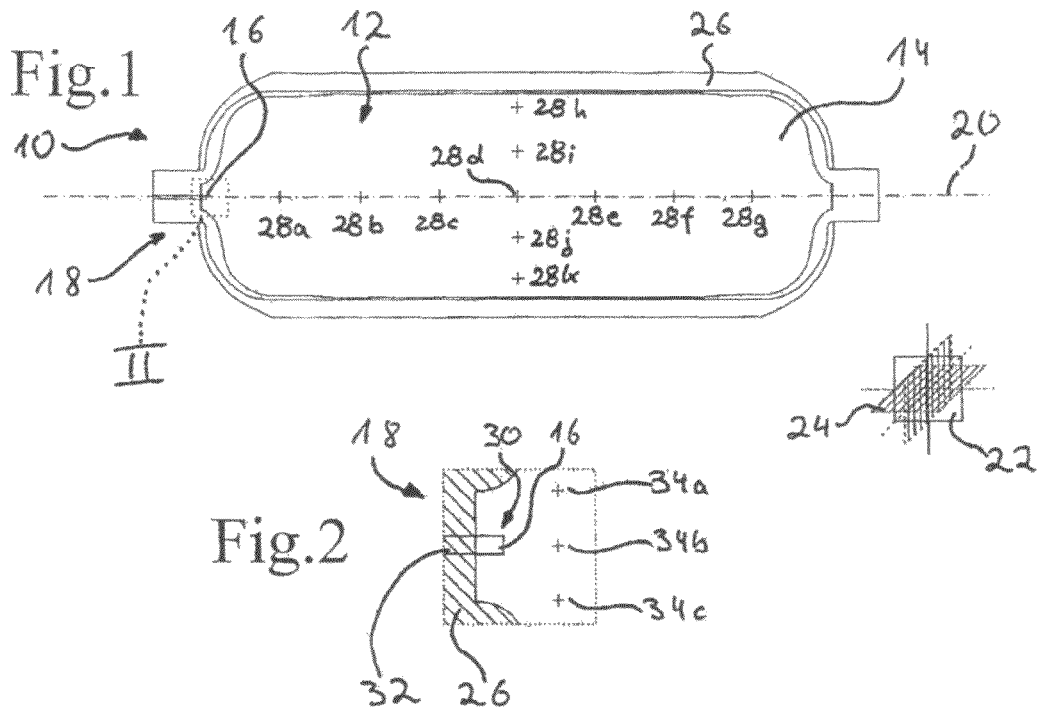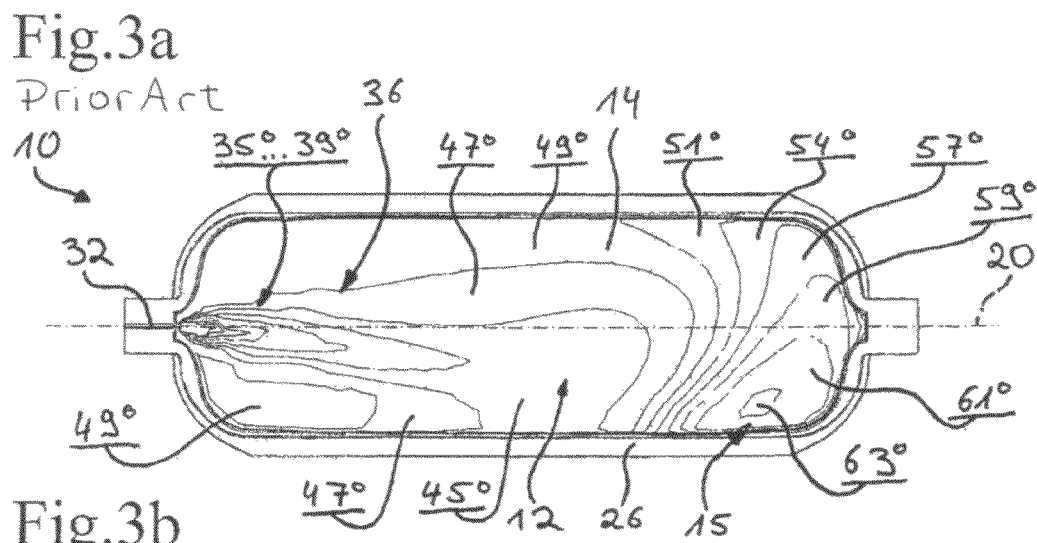

HIGH-PRESSURE GAS TANK AND METHOD OF FILLING A HIGH-PRESSURE GAS TANK

This is a Continuation-In-Part application of pending international patent application PCT/EP2008/004045 filed May 21, 2008 and claiming the priority of German patent application 10 2007 027 027 281.4 filed Jun. 11, 2007.

BACKGROUND OF THE INVENTION

The invention relates to a high-pressure gas tank for motor vehicles, with an interior space for receiving gas and with a filling region with an inflow opening leading to the interior space.

The German laid open publication DE 43 42 210 A1 discloses a tank for cryogenic liquids. In this tank, a liquid volume is stored, above which a gas space is formed within the tank. Due to density differences resulting from different temperatures within the liquid volume, layers form within the liquid volume. So as to avoid this layering, the cryogenic liquid is pumped off in a region near the tank bottom and is again added within the tank and within the gas space above the cryogenic liquid. The adding takes place by means of an energy-rich jet, that is, for example via a comparatively small nozzle with a high flow rate. The jet is aligned at an angle to a surface of the liquid volume, whereby a continuous mixture of the fluid is provided for within the tank. However, this device is only suitable for liquids.

The German laid-open publication DE 100 31 155 A1 discloses a device for quickly introducing gas into a container. This device comprises a nozzle having two annular gaps forming exit openings directed in opposite directions. The introduction of the gas into the container takes place coaxially with a central longitudinal axis of the container. By means of this device, the formation of so-called hot spots are to be reduced and the fueling speed increased.

It is the object based on the present invention to provide a high-pressure gas tank and a method for filling a high-pressure gas tank, wherein, during the fueling, temperature differences of the gas within the gas tank are reduced.

SUMMARY OF THE INVENTION

In a high-pressure gas tank for motor vehicles and a method for filling a high-pressure tank which has an interior space for holding gas and a filling region with an inflow opening which leads to the interior space, the filling region is formed so as to direct a gas jet which enters through the inflow opening at an angle ϕ upwardly with respect to a central horizontal longitudinal axis of the interior space toward a top wall of the tank so as to be deflected thereby toward the end of the tank opposite the filling region.

The high-pressure gas tank according to the invention is designed for use with motor vehicles, wherein the gas tank has an interior space for holding gas and a filling region with an inflow opening which opens into the interior space, which filling region is formed to direct a gas jet entering through the inflow opening into the tank at a certain angle to a longitudinal axis of the interior space of the tank.

The high-pressure gas tank is for example provided for hydrogen or natural gas or the like. The high-pressure gas tank, at least the interior space for holding gas, has essentially a cylindrical form; but it can of course also be spherical for example or have an essentially arbitrary convenient shape. The angle (angle of incidence), at which the incident gas jet is directed into the tank relative to the central longitudinal axis of the interior space, preferably is chosen in such a manner that the gas jet does not impinge at a right angle onto an inner wall of the high-pressure gas tank, but is rather deflected from this wall. The angle of incidence is essentially dependent on the shape of the high-pressure gas tank, on the inflow speed of the gas, the density of the gas and/or for example a surface composition of the inner wall of the gas tank.

By the inflow of the gas jet at an angle to a longitudinal axis of the interior space, the gas jet reaches the mentioned inner wall of the interior space and is deflected therefrom so as to generate swirls in the interior of the gas tank. The swirls provide for a continuous mixing of the gas volume present in the gas tank, whereby the temperature distribution within the gas volume is considerably improved.

A comparatively uniform temperature distribution in the interior space of the gas tank is of particular importance during the filling of the gas tank, as the temperature in the gas tank, especially an average temperature, is a switch-off criterion for the fueling device.

It is also of utmost importance that the actual temperatures within the gas tank are as uniform as possible, that is that the standard deviation of the actual temperature in the gas tank deviates as little as possible from the average temperature. Advantageously, with a uniform distribution of the temperature, no tensions caused by temperature differences can result within the material of which the high-pressure gas tank is manufactured.

In the design of the invention, the jet inclination angle ϕ is in a region between 5° and 35°. An angle between 10° and 20° is particularly preferred. As has already been mentioned previously, the value of the optimal angle depends on several factors. When using the high-pressure tank according to the invention in motor vehicles, the dimensions of the gas tank are limited by the size of the motor vehicle. With these limitations, the desired effect of the mixing becomes again smaller if the inflow angle increases above about 30°. The desired mixing effect is obtained only if the inflow angle is at least about 5°.

In the invention, the gas jet extends essentially in a vertical central plane of the interior space including the central longitudinal axis and at an angle to a horizontal central plane of the interior space including the central longitudinal axis, wherein the angle opens upwardly starting from the horizontal central plane of the interior space. Preferably, the gas jet is introduced into the gas tank in a very central region of the gas tank. The gas jet can thus be deflected from the inner, upper wall of the tank back downwardly such that, the gas jet then can also reach to the opposite sidewalls of the tank. The angle is directed upwardly, since the gas introduced into the gas tank is generally considerably colder than the gas already present in the gas tank. The inflowing gas also has a higher density due to its lower temperature, which is why it will settle automatically on the bottom during the course of the fueling process (that is, the filling a high-pressure gas tank). The mixing of the gas will be optimized with this design.

In the design of the invention, an inflow nozzle is arranged in the filling region. The inflow nozzle has an inflow channel connected to the inflow opening. The inflow channel is arranged at an angle to the central longitudinal axis in the region of the inflow opening. The angle, at which the inflow channel is arranged, at least in its end region to the central longitudinal axis, essentially corresponds to the angle at which the gas jet enters the gas tank. This angle of incidence may however also be set in an arbitrary other manner, for example by means of baffles or the like. However since baffles form deflector surfaces, on which the inflowing gas is compressed and is thus heated, the inflow channel has proved to be particularly advantageous.

In a particular embodiment of the invention, the inflow nozzle is in the form of a nozzle cap. In this manner, the inflow angle can be changed relatively easily, for example simply by exchanging the nozzle cap for a nozzle cap with an inflow channel having a different nozzle angle. By the use of a nozzle cap as inflow nozzle, existing high-pressure gas tanks can for example also be retrofitted with the nozzle cap, whereby the effect of the invention can also be achieved in existing high-pressure gas tanks.

Preferably, the gas tank includes a filler neck which projects into the interior space, and which is provided with the inflow nozzle.

In a further embodiment of the invention, the nozzle cap is arranged at an end face of the filler neck projecting into the tank region. In this manner, the effective introduction of the gas into the interior space of the gas tank takes place within the interior space. A tank filler can thus for example extend between an outer wall of a vehicle and the interior space and possibly be adapted to given conditions, wherein the filler neck can then still control the swirling effect. The length of the filler neck or the region of the filler neck projecting into the interior space of the tank is preferably chosen in such a manner that the swirling effect and the mixing effect of the gas resulting therefrom is optimized.

In a particular embodiment of the invention, a measuring device for measuring a temperature of the gas is provided in the interior space, wherein the measuring device is arranged in a flow shade of the gas jet entering through the inflow nozzle. The measuring device for measuring a temperature can essentially be designed in an arbitrary manner, for example it may be provided only in sections of the interior of the gas tank. In any case, the measuring device has a sensor-like section, by means of which the temperature to be determined is detected and which generates an output signal or the like. The measuring device further has an evaluation section for evaluating the output signal. As the temperature in the interior space of the gas tank is also a switch-off criterion for terminating the fueling process, it is advantageous if the measuring device reacts quickly to temperature changes. The arrangement of the measuring device in the flow shade of the gas jet has to be chosen as the gas jet itself has an essentially constant temperature, for example about 35° C. It has been found surprisingly that the temperature of the gas in the flow shade of the gas jet deviates only little from an average temperature value within the gas tank.

Preferably, the measuring device is arranged above a horizontal central plane of the interior space enclosing the central longitudinal axis adjacent to the filling region. The measuring device is preferably arranged between the inflow opening and a wall section of the high-pressure gas tank or it is mounted to the wall in this region. It has been shown that the lowest temperature deviations from an average temperature can be found in this region of the gas tank. The arrangement of the measuring device above the inflow opening is advantageous, because the cold gas entering via the inflow opening subsequently settles due to its higher density, and thereby distorts the temperature measurement, if the temperature sensor is arranged below and/or to the side of the inflow opening. An arrangement of the measuring device below and/or to the side of the inflow opening however can still be expedient under certain conditions.

It is the principal object of the present invention to provide a method for filling a high-pressure gas tank, in which a gas jet entering through an inflow opening is installed in such a way that the gas entering the tank is efficiently mixed with the high-pressure gas present in the tank.

The invention will become more readily apparent from the following description of a particular embodiment of the invention on the basis of the accompanying drawings:

BRIEF DESCRIPTION OF THE DRAWINGS

FIG. 1 is a lateral sectional view of a high-pressure gas tank according to the invention with position markings of virtual temperature sensors arranged in the high-pressure gas tank, FIG. 2 is an enlarged detailed view according to II in FIG. 1 showing positions of to further virtual temperature sensors in the filling region, FIG. 3a is a lateral sectional view of a high-pressure gas tank (state of the art) with isometric lines arranged therein for the illustration of a temperature distribution within the gas tank during a fueling process, FIG. 3b is a lateral sectional view of a high-pressure gas tank (state of the art) with isometric lines arranged therein for the illustration of a temperature distribution within the gas tank approximately 120 seconds after the end of the fueling process.

DESCRIPTION OF PARTICULAR EMBODIMENTS

Figure 4:
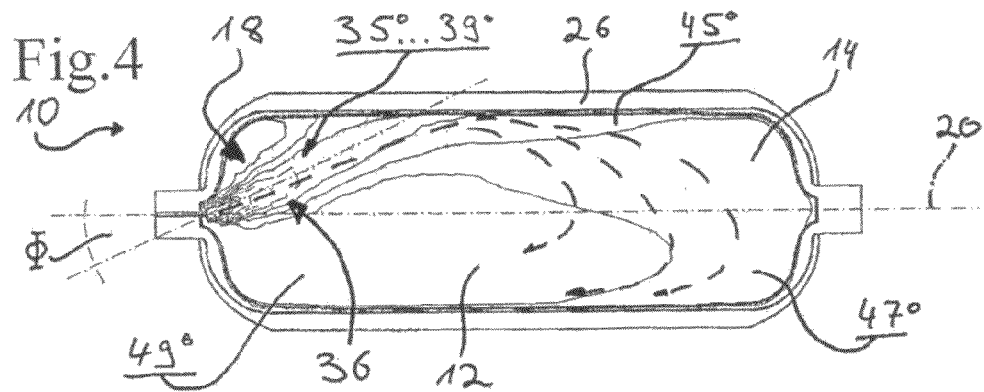
FIG. 4 is a lateral sectional view of a high-pressure gas tank according to the invention during a fueling process.

FIG. 1 shows a high-pressure gas tank 10 for vehicles, for example so-called hydrogen-fueled vehicles in a lateral sectional view. The high-pressure gas tank 10 has an interior space 12 for holding gas 14. An inflow opening 16 opens into the interior space 12, which opening is arranged in a filling region 18.

The high-pressure gas tank 10 is essentially formed as a rotational-symmetrical cylinder with end walls curved around a central longitudinal axis 20. The central longitudinal axis 20 is arranged in a vertical central plane 22 of the interior space 12, and extends parallel to the viewing plane of FIG. 1. The central longitudinal axis 20 extends furthermore in a horizontal central plane 24 of the interior space 12.

The high-pressure gas tank 10 has a wall 26, which can for example have thermally insulating properties and which is formed with regard to material and design in such a manner that the gas tank 10 is stable with regard to pressure. A preferred form of the gas tank 10 is thus the cylinder form.

In the interior space 12 of the gas tank, marked positions of virtual temperature measuring devices 28a . . . k are marked by means of crosses. The virtual temperature sensors 28a . . . k serve for the illustration of the invention shown. The temperature sensors 28a . . . g are arranged equidistantly from the respective adjacent temperature sensors along the central longitudinal axis 20 of the interior space 12. The temperature sensors 28h . . . k are arranged perpendicular to the central longitudinal axis 20 and on the vertical central plane 22.

FIG. 2 shows, enlarged, the section II of FIG. 1, which includes the filling area 18, in which the inflow opening 16 is arranged. The inflow opening 16 is arranged at an end face 30 of a filler neck 32. The inflow opening 16 can for example be provided by a nozzle cap. According to FIG. 2, the filler neck 32 projects only a little, for example a few millimeters, into the interior space 12 of the tank 10. If expedient, the neck 32 may also project a few centimeters, up to some ten centimeters, into the interior space 12.

FIG. 2 also shows further measuring devices 34a, b, c, which are also temperature sensors. The measuring device 34a is arranged above the filler neck 32 in the viewing plane, and specifically in the area of the wall 26. The temperature sensors 34b, 34c are also arranged in the area of the wall 26, however the temperature sensor 34b is arranged at the level of the filler neck 32 and the temperature sensor 34c is arranged below the filler neck 32 in the viewing plane of FIG. 2. The measuring devices 34 are arranged according to FIG. 2 in front of the inflow opening 16 of the filler neck 32, that is, exactly in the region in which the gas to be filled into the tank 10 exits from the inflow opening 16. The uppermost measuring device 34a in the viewing plane may be arranged nearer to the wall 26, preferably in an area between the inflow opening 16 and the wall 26. In this manner, the measuring device 34a is arranged in the flow shade of the inflowing gas jet. An exemplary and preferred possibility of an arrangement of the measuring device 34a in the inflow region 18 is described with regard to FIG. 8.

The positions of the virtual measuring devices 28a . . . k, 34a, b, c as shown in FIGS. 1 and 2 were used to calculate the course of the isometric lines shown in FIG. 3a, FIG. 3b and FIG. 4, wherein the isometric lines respectively represent boundaries between two adjacent temperature regions. The high-pressure gas tank 10 shown in FIGS. 3a and 3b is a gas tank according to the state of the art. FIG. 3a shows this gas tank 10 during the filling of the gas tank 10 with a gas 14, wherein this gas 14 is introduced into the gas tank in the form of a jet, that is as a gas jet 36. The gas jet 36 is essentially rotationally symmetrical and has, at least in the region shortly after its exit from the inflow opening 16, only a small opening angle. The gas jet 36 is introduced into the gas tank 10 coaxially to the central longitudinal axis 20 of the gas tank 10. After the gas jet 36 has left the inflow opening of the filler neck 32, the gas 14 expands due to the sudden reduction in pressure and is cooled thereby. Apart from this, the gas is already provided in a pre-cooled manner. When the gas exits from the filler neck 32, it has a temperature between 35° C. and 39° C. Due to the higher density of colder gas compared to hotter gas, the gas 14 just entered into the interior space 12 settles downwards due to gravity. On the side of the gas tank 10 opposite the filler neck 32, the gas 14 already stored in the gas tank 10 is compressed by the gas 14 flowing in. This compression results in a heating of the gas 14 at least in regions, specifically in the previously described region of the interior space, which lies opposite the inflow opening 16. So-called hot spots 15 can result thereby, as is shown for example in a corner of the gas tank 10 on the right in the viewing plane. The gas can be as hot as up to 75° C. in these hot spots 15. This effect occurs to a larger extent the greater the ratio of the container length to the container diameter is.

In FIG. 3b, which shows the same state of the art gas tank 10 as FIG. 3a, this gas tank is shown in a state 120 seconds after the fueling shown in FIG. 3a. It can be seen from FIG. 3b, that the temperatures within the gas 14 have become essentially uniform. As this adjustment took place within about 120 seconds, it is without question that the comparatively fast heating or cooling of the gas 14 within the gas tank will also lead to tensions caused by temperature differences within the material, from which the walls 26 of the gas tank are manufactured. It can further be seen that the fueling of the gas tank 10 according to the state of the art takes place in an extremely inexact manner, as the standard deviation of the temperature from an average value is comparatively high. This average temperature value is however used amongst others to terminate the fueling process of the high-pressure gas tank 10.

In contrast to the gas tank shown in FIG. 3a, the gas jet 36, with which the high-pressure tank 10 according to FIG. 4 is fueled, is disposed at an angle of about 20° to the central longitudinal axis 20. The gas jet 36 is directed toward the wall 26 in such a manner that it is reflected by the wall 26 and is guided to the end region of the gas tank 10, which is opposite the filling region 18. As is shown in FIG. 4 by dashed lines, a turbulent mixing of the gas 14 just introduced into the gas tank 10 with the gas 14 already present in the gas tank 10 is caused thereby, resulting in a comparatively uniform temperature of the supplied gas and the gas already present. Due to this mixing of the supplied gas 14 and gas 14 already present, large temperature differences do not occur within the interior space 12. A maximum temperature of the gas 14 in FIG. 4 is thus only about 47° C. By the more uniform temperature distribution or the altogether lower increase of the temperature of the gas 14 in the interior space 12 of the gas tank 10, the assumed average temperature of the gas, which is also used as switch-off criterion, is not subjected to considerable fluctuations.

An optimum angle φ shown in FIG. 4 is about 20°. It is based on the essentially cylindrical gas tank having a certain ratio of a length of the interior space 12 along the central longitudinal axis 20 to a height of the interior space 12, which corresponds to the diameter of the cylinder forming the interior space 12. It has been shown that with long, small diameter interior spaces 12 having a length:height ratio of at least 4:1, an angle φ between 5° and 10° is suitable for the desired mixing effect. Whereas, with short large diameter interior spaces 12 with a length:height ratio of 4:1 or less, a larger angle φ proved to be advantageous, possibly even an angle φ between 20° and 30°.

The cooperation between the chosen angle φ and the length:height ratio shows a clear effect in the overflow speed of the gas jet 36 over the container wall 26 or the speeds of the gas near the wall. Especially large overflow speeds have to be aimed for to improve a heat transfer between gas 14 or the gas jet 26 and the container wall 26. The choice of the inflow angle φ has thus essentially to be adjusted specifically to the gas tank 10 with the respective determined length:height ratio, so that the gas jet extends in the direction toward the container wall and the asymmetry resulting therefrom leads to an increased agitation movement.

As noted the gas jet 36, as shown in FIG. 4, is preferably deflected upwards within the gas tank 10. This takes place because the gas 14 introduced into the interior space 12 is generally colder than the gas 14 already present in the interior space, so that it has a higher density and settles automatically due to gravity. The gravity can thereby assist in providing for a uniform mixing of the gas.

Figure 5:
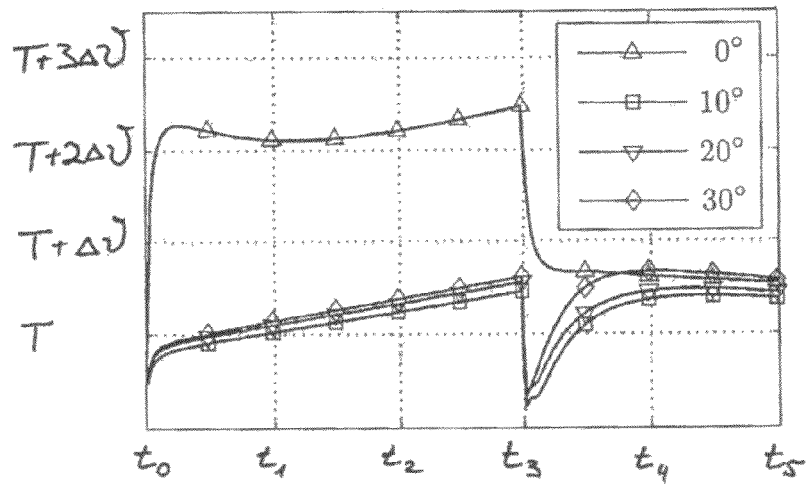
FIG. 5 shows a diagram for the demonstration of a standard deviation of the local temperature from the average value during and after a fueling process, in dependence on different inflow angles.

In the diagram shown in FIG. 5, the standard deviation of the local temperature from the average value during and after a fueling process can be seen. The fueling process shown in FIG. 5 takes place in a period between $t_0$ and $t_3$. It can clearly be seen in this diagram that the standard deviation of a local temperature is comparatively high with an inflow angle φ=0°, wherein this standard deviation is shown by the marked line by means of the upwardly directed triangles. By means of the further three closely adjacent lines, the standard deviation of a local temperature is shown by an average temperature value with an inflow angle of 10°, 20° or 30° of the gas jet, which is obviously considerably lower than with an inflow angle of 0°. Under realistic conditions, the standard deviation of the local temperature can thus be reduced by up to 5° C. by means of the arrangement according to the invention.

At the time $t_3$, the standard deviation of the local temperatures falls suddenly. This happens due to the fueling being finished at the time $t_3$, thus the comparatively cold gas jet no longer contributes to the formation of the average value. From the time $t_3$, the standard deviation slowly adjusts again to the average temperature value which was present prior to the fueling process.

Figure 6:
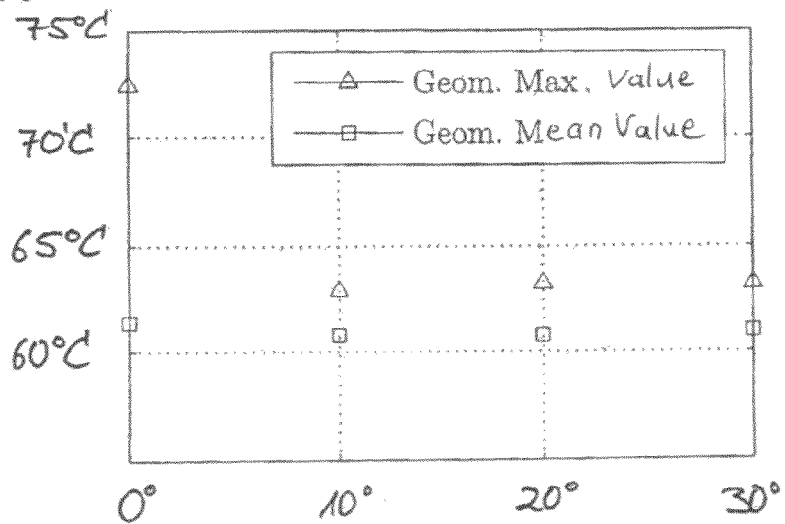
FIG. 6 shows a diagram indicating achieved maximum temperatures of the gas within the tank during a fueling process with different inflow angles, FIG. 7 a lateral view of a filler neck with a nozzle cap shown partially in section, and FIG. 8 an enlarged detailed view according to II in FIG. 1, with a filler neck provided in the filling region and measuring device.

The diagram of FIG. 6 shows measured local maximum temperature values or calculated average temperature values in the gas present within the gas volume stored in the high-pressure gas tank. It can be seen from the diagram on the one hand, that local temperature maximums of about 75° C. result with an angle of incidence of 0°. On the other hand, it can be seen from the diagram that the temperature difference between the local maximum value and the average temperature is very large with an inflow angle of 0°, namely about 10° C. In contrast to this, the local temperature maximum values with an inflow angle of 10°, 20° or 30° are only marginally larger than the measured average temperature values within the gas.

Figure 7:
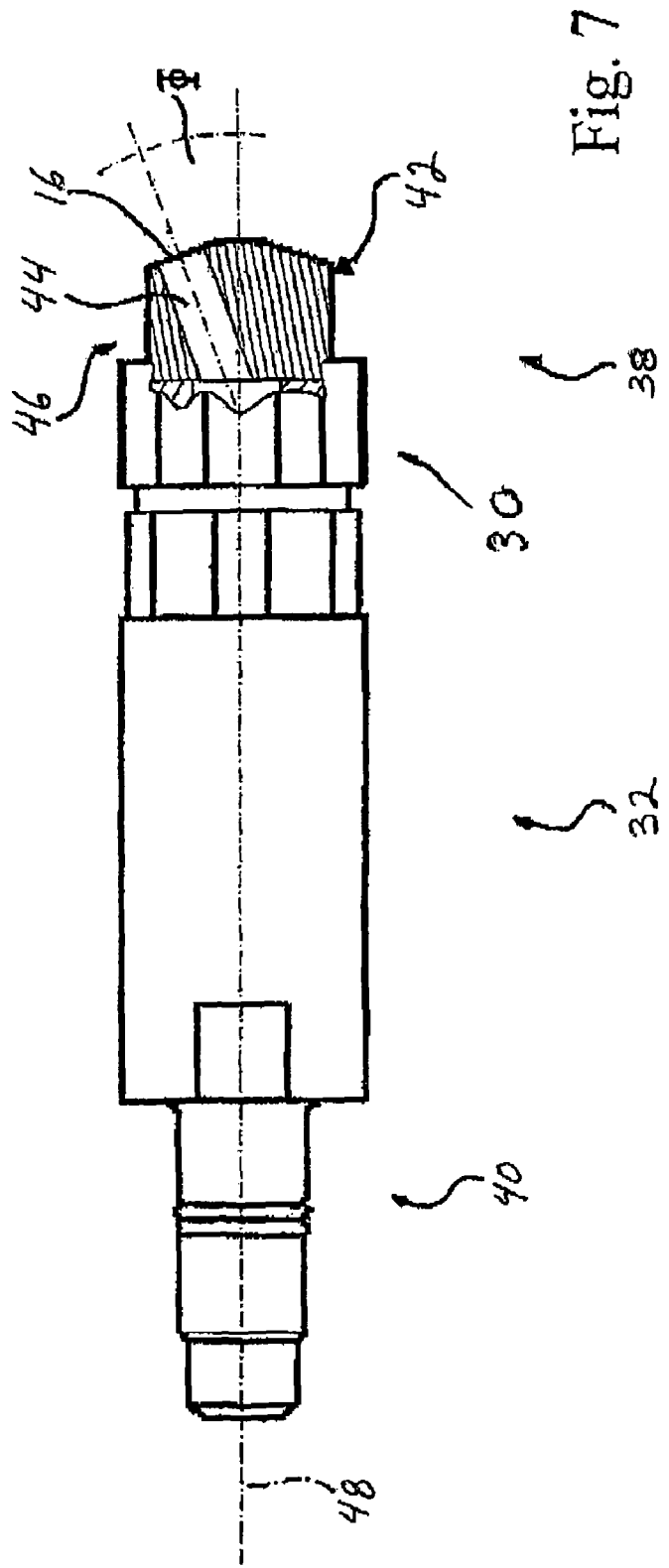

The filler neck 32 shown in FIG. 7 has an end region 38 facing the interior space of the high-pressure gas tank and an end region 40 turned away from the inner pressure, which can also be arranged in a region outside the high-pressure gas tank. In the end region 38, a nozzle cap 42 is arranged at the face end 30 of the filler neck 32, particularly screwed on. The nozzle cap 42 has an inflow channel 44, which ends with the inflow opening 16. The nozzle cap 42 with the inflow channel 44 and the inflow opening 16 forms an inflow nozzle 46. The gas jet is aligned relative to the central longitudinal axis of the internal space by means of the inflow nozzle 46, which axis proceeds coaxially to the central longitudinal axis 48 of the neck 32 at an angle, namely an angle φ. The inflow opening has a comparatively small diameter, which is especially smaller or equal to 5 mm, whereby the inflow speed is increased. A high inflow speed improves the mixing of the gas layers further, whereby the temperature distribution will become more uniform.

An essentially arbitrary angle φ can be adjusted by means of the nozzle cap 42 in a simple manner, namely in that a mounted nozzle cap 42 is exchanged for another nozzle cap 42, by means of which another inflow angle φ is realized.

Figure 8:
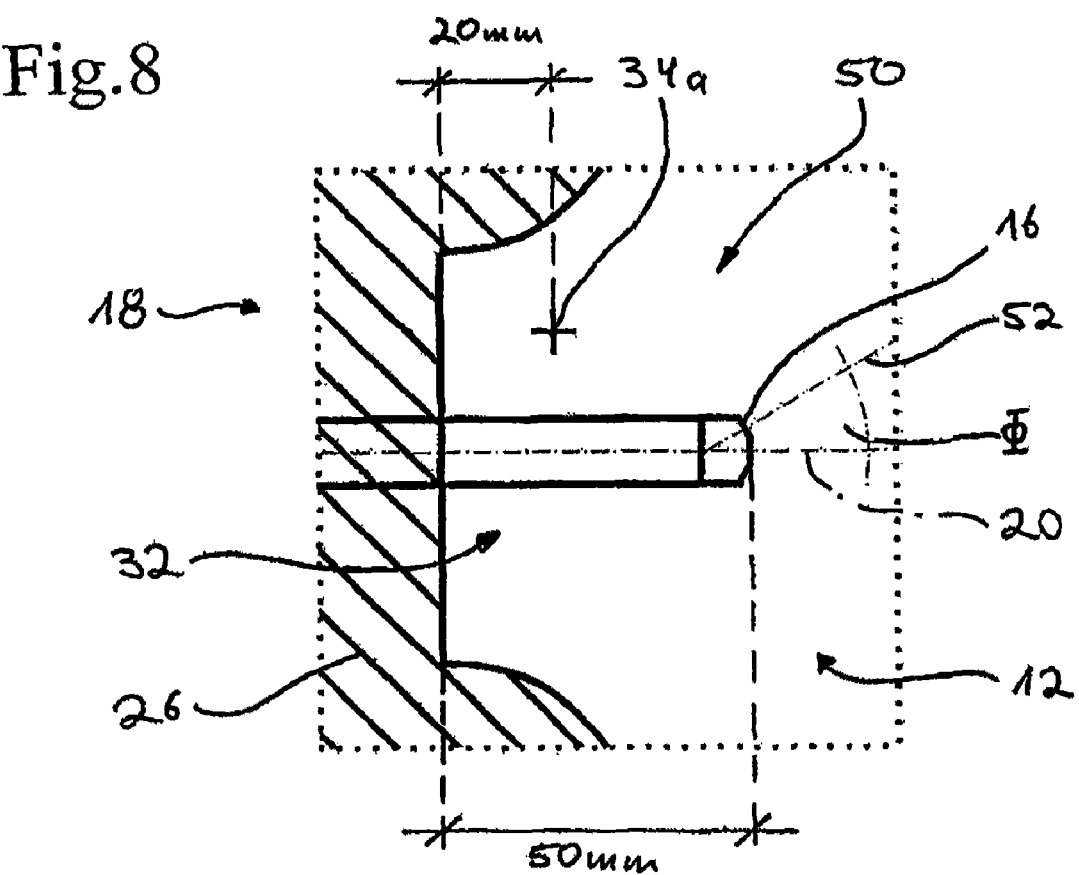

The enlarged section according to II in FIG. 1 shown in FIG. 8 shows a particularly preferred arrangement of a measuring device 34a in the form of a temperature sensor arranged in the filling region 18. The measuring device 34a is arranged in a region 50, which is in the drawing plane of FIG. 8 above the central longitudinal axis 20 and between a central axis 52 of the gas jet exiting the inflow opening 16, not shown in FIG. 8, and the wall of the gas tank. This region 50 is in a flow shade of the gas jet. So as to provide for this flow shade, the filler neck 32 projects into the interior space of the gas tank, for example by 50 mm. It has been shown that with an inflow angle φ of 20°, a preferred position for the arrangement of the measuring device 34a is not directly at the wall 26, but spaced from the wall 26, for example at a distance of about 20 mm. The standard deviation of the local temperature during the fueling process compared to other positions within the interior space 12 is surprisingly the lowest within the flow shade of the gas jet in the region 50. The temperature measured in the region 50 is especially suitable as a switch-off criterion for the fueling process.

What is claimed is:

1. A high-pressure gas tank for motor vehicles, the gas tank (10) having a central axis (20) and an interior space (12) for holding pressurized gas (14), the tank further including a filling region (18) at one end thereof with a gas inflow opening (16) which opens out into the interior space (12) and is oriented upwardly with respect to the central longitudinal axis (20) so as to direct a gas jet (36) entering the tank (10) through the inflow opening (16) in such a manner that a central axis of the gas jet extends at an angle φ to the central longitudinal axis (20) of the interior space (12) for directing a gas jet toward the top wall of the gas tank (10) so as to be reflected thereby toward the end of the tank opposite the filling region (18), wherein the angle φ is in a region between 5° and 35°.

2. The high-pressure gas tank (10) according to claim 1, wherein the angle φ is between 10° and 20°.

3. The high pressure gas tank (10) according to claim 1, comprising an inflow nozzle (46) arranged in the filling region (18) the inflow nozzle (46) including an inflow channel (44) which is in communication with the inflow opening (16) and is arranged so as to extend also at the angle φ to the central longitudinal axis.

4. The high-pressure gas tank (10) according to claim 1, wherein the inflow nozzle is in the form of a nozzle cap.

5. The high-pressure gas tank (10) according to claim 1, wherein the filling region (18) includes a filler neck (32) which projects into the inner space (12) and is provided with the inflow nozzle (46).

6. The high-pressure gas tank (10) according to claim 4, wherein the nozzle cap (42) is arranged at an end face (30) of the gas tank (10) and projects into the interior space (12) of the tank (10).

7. The high-pressure gas tank (10) according to claim 1, wherein a measuring device (28, 34) is provided in the interior space (12) for measuring a temperature of the gas (14), the measuring device (28, 34) being arranged in a flow shade of the gas jet (36) entering through the inflow opening (16) between the inflow opening (16) and a wall (26) of the high-pressure gas tank (10) at a distance from the wall (26).

8. The high-pressure gas tank (10) according to claim 7, wherein the measuring device (28, 34) is arranged above a horizontal central plane (24) of the interior space (12) including the central longitudinal axis (20) adjacent the filling region (18).

* * * * *